(12) United States Patent
Tian et al.

(10) Patent No.: US 9,602,364 B2
(45) Date of Patent: *Mar. 21, 2017

(54) DYNAMIC AND ADAPTIVE QUOTA SHARES

(71) Applicant: International Business Machines Corporation, Armonk, NY (US)

(72) Inventors: Zhiyong Tian, Beijing (CN); Yuri Volobuev, Walnut Creek, CA (US); Kuei-Yu Wang-Knop, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,770

(22) Filed: Aug. 19, 2015

(65) Prior Publication Data
US 2015/0358216 A1   Dec. 10, 2015

Related U.S. Application Data

(63) Continuation of application No. 14/193,275, filed on Feb. 28, 2014.

(51) Int. Cl.
| | |
|---|---|
| *H04L 12/24* | (2006.01) |
| *G06F 17/30* | (2006.01) |
| *H04L 29/08* | (2006.01) |
| *H04L 12/911* | (2013.01) |
| *G06F 9/00* | (2006.01) |

(52) U.S. Cl.
CPC ........... *H04L 41/5054* (2013.01); *G06F 9/00* (2013.01); *G06F 17/30082* (2013.01); *H04L 47/822* (2013.01); *H04L 67/10* (2013.01); *H04L 67/16* (2013.01)

(58) Field of Classification Search
CPC .............................. H04L 47/822; H04L 67/10
USPC ......................................................... 709/226
See application file for complete search history.

(56) References Cited

U.S. PATENT DOCUMENTS

| | | | | |
|---|---|---|---|---|
| 5,946,686 A | * | 8/1999 | Schmuck | G06F 17/30224 707/783 |
| 7,685,597 B1 | * | 3/2010 | Czajkowski | G06F 9/5016 717/120 |

(Continued)

OTHER PUBLICATIONS

U.S. Appl. No. 14/193,275, Non-Final Office Action, Date Filed: Feb. 28, 2014; Date Mailed: Sep. 30, 2015, 13 pages.

(Continued)

*Primary Examiner* — Thuong Nguyen
*Assistant Examiner* — Eric Moore
(74) *Attorney, Agent, or Firm* — Cantor Colburn LLP; Steven Chu

(57) ABSTRACT

Embodiments relate to dynamically allocating access to a shared resource based on quota shares. An aspect includes computing, by a client node, an expected size of quota shares needed by the client node based on a historical rate of resource consumption by the client node. The client node transmits a request for a count of quota shares based on the expected size. The client node receives an indication that the request for the count of quota shares is one of: granted, denied, and granted-in-part. The client node self-rules the shared resource based on the indication.

8 Claims, 3 Drawing Sheets

(56) References Cited

U.S. PATENT DOCUMENTS

| | | | |
|---|---|---|---|
| 2003/0182349 A1* | 9/2003 | Leong | G06F 3/061 |
| | | | 718/100 |
| 2010/0005473 A1 | 1/2010 | Blanding | |
| 2011/0138051 A1* | 6/2011 | Dawson | G06F 9/5072 |
| | | | 709/226 |
| 2011/0161973 A1* | 6/2011 | Klots | G06F 17/30566 |
| | | | 718/104 |
| 2013/0073732 A1* | 3/2013 | Vicat-Blanc-Primet | H04L 41/0893 |
| | | | 709/226 |
| 2013/0103641 A1* | 4/2013 | Rehman | G06F 3/048 |
| | | | 707/609 |
| 2013/0304909 A1* | 11/2013 | Pappu | H04L 43/04 |
| | | | 709/224 |
| 2014/0278496 A1* | 9/2014 | Spencer | G06F 19/327 |
| | | | 705/2 |

OTHER PUBLICATIONS

U.S. Appl. No. 14/193,275; Final Office Action, Date Filed Feb. 28, 2014; Date Mailed: Feb. 24, 2016; 16 pages.

* cited by examiner

DYNAMIC AND ADAPTIVE QUOTA SHARES

DOMESTIC PRIORITY

This application is a continuation of U.S. patent application Ser. No. 14/193,275, filed Feb. 28, 2014, the content of which is incorporated by reference herein in its entirety.

BACKGROUND

The present invention relates generally to computing technology, and more specifically, to dynamic and adaptive quota shares in a distributed file system.

Quota functions associated with file systems are used to count and restrict resource usage. Accounting information is provided regarding usage and limits are set by an administrator. Based upon such information, a file system decides whether a resource is allocated to an entity.

Quota functionality is distributed to one or more nodes. Generally there are two types or kinds of roles for these nodes. A first role is a quota manager or manager node that maintains global quota information. A second role is a quota client or client node that consumes resources associated with the quota and only manages a localized quota within the node.

Each client node may be allocated an allowance or share of the overall quota. Conventionally quota shares are implemented as fixed sizes for simplicity. However, such an approach is inefficient in terms of throughput or performance given dynamic conditions that may be present. For example, use of fixed-size quota shares may introduce bottlenecks into a file system.

SUMMARY

Embodiments include a method, system, and computer program product for dynamically allocating access to a shared resource based on quota shares. An aspect includes computing, by a client node, an expected size of quota shares needed by the client node based on a historical rate of resource consumption by the client node. An aspect includes transmitting, by the client node, a request for a count of quota shares based on the expected size. An aspect includes receiving, by the client node, an indication that the request for the count of quota shares is one of: granted, denied, and granted-in-part. An aspect includes self-ruling, by the client node, the shared resource based on the indication.

In some embodiments, a computer program product is provided for dynamically allocating access to a shared resource based on quota shares. The computer program product comprises a computer readable storage medium having program instructions embodied therewith, the program instructions readable by a client node to cause the client node to perform a method. The method comprises computing an expected size of quota shares needed by the client node based on a historical rate of resource consumption by the client node. The method comprises transmitting a request for a count of quota shares based on the expected size. The method comprises receiving an indication that the request for the count of quota shares is one of: granted, denied, and granted-in-part. The method comprises self-ruling the shared resource based on the indication.

In some embodiments, a computer system is provided for dynamically allocating access to a shared resource based on quota shares. The system comprises a manager node and a plurality of client nodes. The system is configured to perform a method. The method comprises computing, by each of the client nodes, an expected size of quota shares needed by the client node based on a historical rate of resource consumption by the client node. The method comprises transmitting, by each of the client nodes, a request for a count of quota shares to the manager node based on the expected size for the client node. The method comprises receiving, by each of the client nodes, an indication from the manager node that the request for the count of quota shares is one of: granted, denied, and granted-in-part. The method comprises self-ruling, by each of the client nodes, the shared resource based on the indication.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In accordance with one or more embodiments, systems, apparatuses, and methods are described that provide for a distribution of quota share management. The distribution is used to realize a low cost communication approach (e.g., minimal communication between a manager and clients) while maintaining accurate quote accounting in a distributed file system environment.

In some embodiments, a client transmits a dynamic, optimized size of quota shares to a manager based upon the client's historical rate of resource consumption. In some embodiments, a manager may distribute quota shares fairly or equitably. An equitable distribution may entail providing a larger share of the overall quota to busy clients, e.g., those clients that handle more operations relative to other clients. The operations may include input/output (I/O) handling. Similarly, a lesser share of the overall quota may be provided to idle clients in case the majority of the assigned shares are not used. In this manner, a triggering by the manager to the clients to reclaim any unused quota may be minimized.

In some embodiments, clients record historical usage information (e.g., disk blocks/files) for every entity (e.g., users, groups, etc.). A client transmits a quota request to a manager based on the recorded historical usage information stored at the client. The manager provides, and the client receives, an indication that grants, denies, or grants-in-part (e.g., reduces) the requested quota based upon global quota information. The global quota information may include an identification or specification of remaining quota and how many active quota clients exist. Clients may voluntarily release or return unused quota shares based upon the historical usage information.

Figure 1:
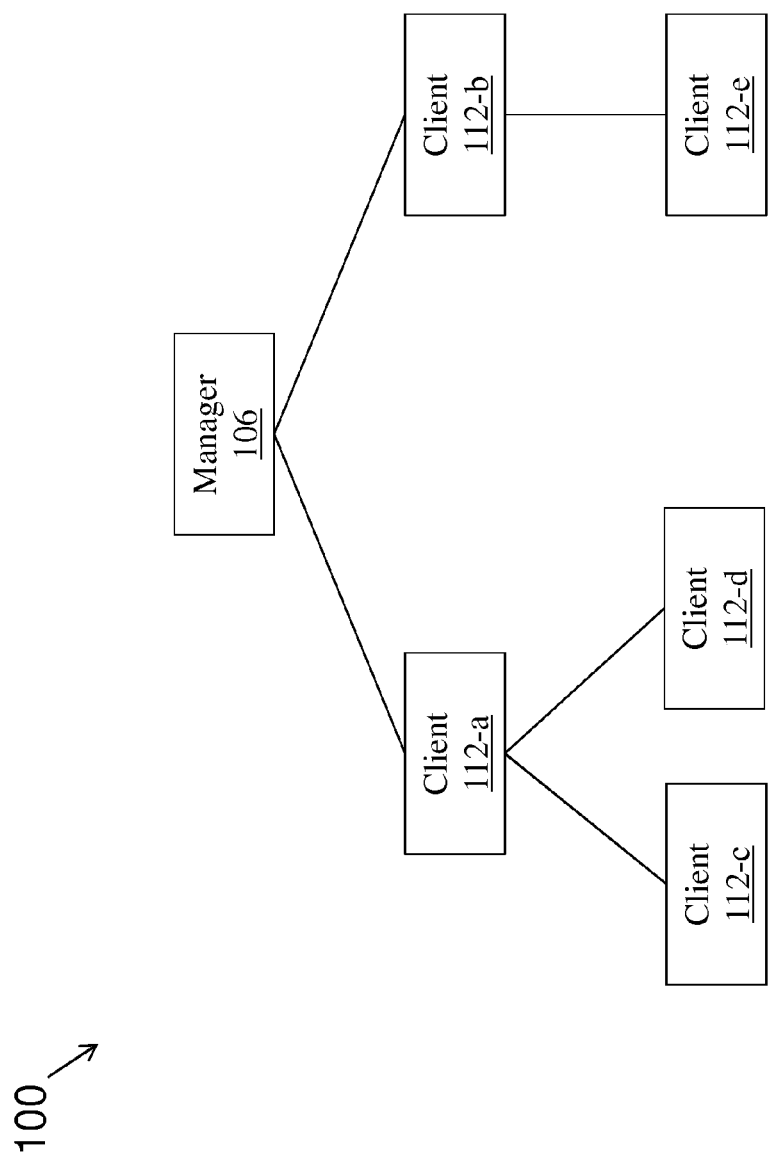
FIG. 1 depicts a computing system environment in accordance with an embodiment.

Turning now to FIG. 1, a computing system 100 is generally shown. The system 100 may be associated with a file system, such as a distributed file system. The system 100 may be associated with one or more networks, such as one or more computer, cable, cellular, or telephone networks.

The system 100 may include a number of devices or nodes. For example, as shown in FIG. 1, the system 100 may include a manager 106 and one or more clients, such as clients 112-a through 112-e (any one, or combination, of which is referred to herein as a client 112). The manager 106 may be coupled to a client 112 over one or more communication mediums.

The manager 106 and the clients 112 may include one or more components or devices as would be known to one of skill in the art. For example, in an embodiment the manager 106 and the clients 112 each include: (1) at least one processor, and (2) memory having instructions stored thereon that, when executed by the at least one processor, cause the manager 106/client 112 to perform one or more methodological acts. Other components/devices may be included, such as storage for data.

The manager 106 may be responsible for allocating and (re)distributing quota shares amongst the clients 112. The clients 112 may consume resources based on the allocated quota shares. In some embodiments, a resource may be consumed or used by one or more clients 112. In some embodiments, a resource may be consumed or used by a first client 112 (e.g., client 112-a) at a first instance in time and the resource may be consumed or used by a second client 112 (e.g., client 112-b) at a second instance in time.

In FIG. 1, a dedicated manager 106 is shown. In some embodiments, the role of manager itself may be distributed or shared amongst the nodes, potentially over time. Thus, a given node may serve as a manager at a first instance in time and may serve as a client at a second instance in time.

In the embodiment of FIG. 1, clients 112-a and 112-b may serve as clients with respect to manager 106. Client 112-a may serve as a manager with respect to clients 112-c and 112-d. Client 112-b may serve as a manager with respect to client 112-e.

The system 100 is illustrative. A skilled artisan would appreciate that any number of managers 106 and clients 112 may be included in a given embodiment. Moreover, the managers 106 and clients 112 may be arranged with respect to one another in any manner or at any level of abstraction.

In accordance with one or more aspects of this disclosure, three time periods are defined. A first such time period is referred to as a short-term period (STP). At the end of every STP, usage is updated/changed and recorded for every entity or node. A second such time period is referred to as a medium-term period (MTP). At the end of every MTP, usage is updated/changed and recorded for every entity or node. A third such time period is referred to as a long-term period (LTP). At the end of every LTP, usage is updated/changed and recorded for every entity or node. The three time periods (STP, MTP, and LTP) may be relative to one another, such that the STP may be shorter than the MTP, and the MTP may be shorter than the LTP. The amount of time associated with STP, MTP, and LTP may be established based on any system requirements or parameters or based on an associated application.

In accordance with one or more aspects of this disclosure, a minimal quota share (MQS) may be defined as the smallest quota transfer that can be transferred. Such transfer may occur from a client (e.g., client 112) to a manager (e.g., manager 106), or vice versa.

In accordance with one or more aspects of this disclosure, an expected self-rule time (ESRT) may be defined in the context of quota shares. A client may hope to obtain a quota share from a manager, potentially based on historical usage information. The client may self-rule quota allocation on its own node for this time.

As described above, historical usage information associated with clients may be recorded. For every client or node, a vector may be defined that contains LTP/STP slots. Each slot stores the index-node or inode (file) usage, the block usage, and the time point when this information is recorded. Based on this vector, a consumption rate may be known between any two slots.

There are at least two techniques that may be used to update a vector. A first technique is to update the vector whenever usage is changed. A second technique is to utilize a background thread that updates the vector every STP. A general parallel file system (GPFS) may update the vector using the first technique.

Figure 2:
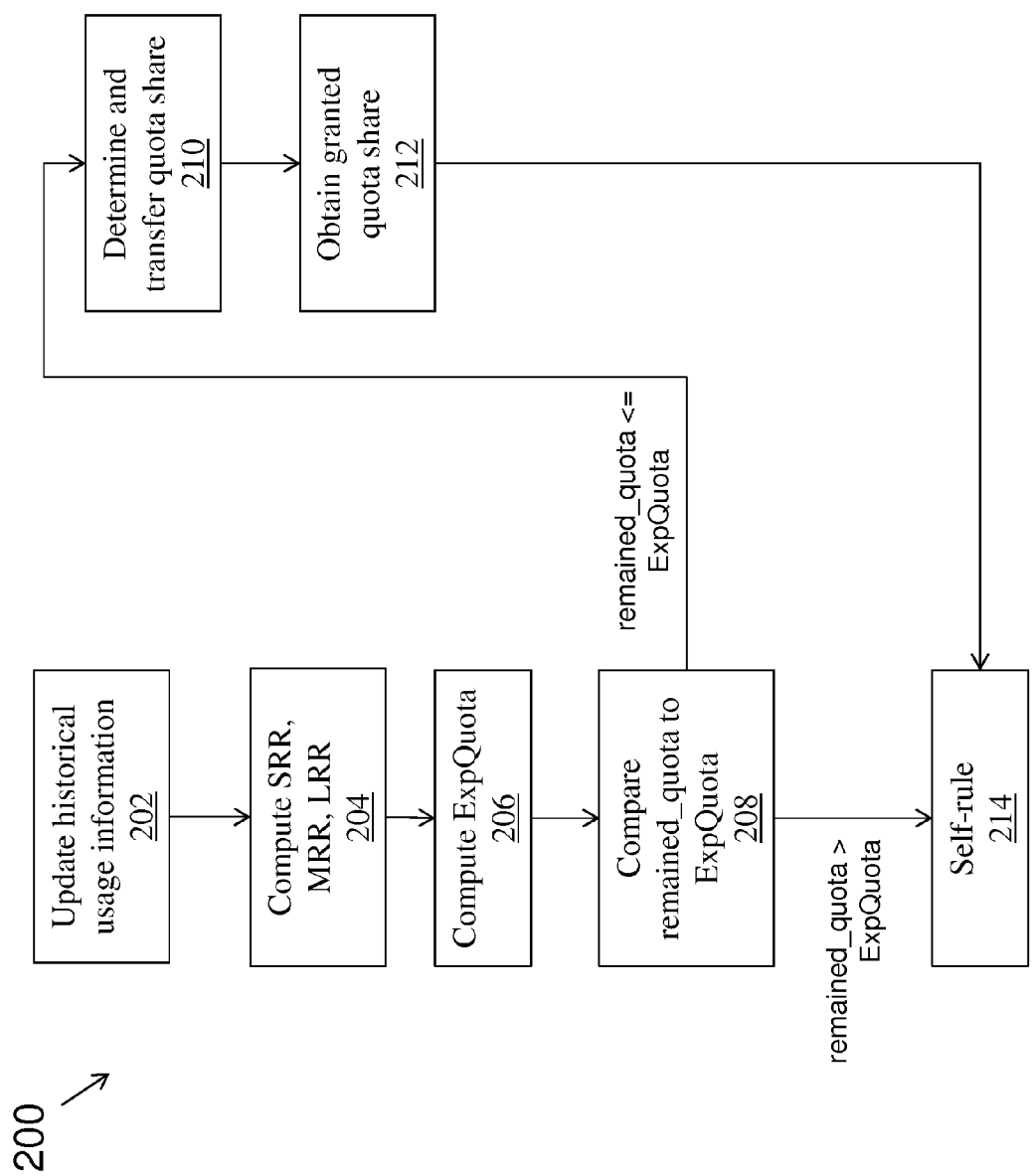
FIG. 2 depicts a process flow based on a consumption of a resource in accordance with an embodiment.

Turning to FIG. 2, a flow chart of a method 200 is shown. The method 200 may be executed by one or more systems, devices, or components, such as those described herein. The method 200 may execute based on, or in response to, a consumption of a resource.

In block 202, a client may update historical usage information.

In block 204, the client may compute a short-term resource-consuming rate (SRR), a medium-term resource-consuming rate (MRR), and a long-term resource-consuming rate (LRR). The computation may be based on the vector described above.

In block 206, the client may compute an expected quota (ExpQuota). For example, the computation of block 206 may take the form: ExpQuota=MAX(MAX(SRR, MRR, LRR)*ESRT, MQS), where the MAX function serves to select the maximum value from the input parameters or arguments to the function.

In block 208, the client may compare any remaining quota (remained_quota) currently available to the client to the expected quota (ExpQuota). If the remained_quota is less than or equal to the ExpQuota: (1) the client may transmit a quota request to the manager so that the client has at least, e.g., two times ExpQuota (2*ExpQuota) after the request is fulfilled, and (2) flow may proceed to from block 208 to block 210. Otherwise, if the remained_quota is greater than ExpQuota, flow may proceed from block 208 to block 214.

In block 210, the manager may determine a quota share to transfer to the client based on the request of block 208. For example, the manager may grant and transfer a quota share to the client that is equal to the quota requested by the client if the quota requested by the client is less than or equal to the total remaining quota (total_remaining_quota) divided by the number of clients (#_of clients). Otherwise, if the quota requested by the client is greater than (total_remaining_quota/#_of_clients) the manager may grant and transfer a quota share that is equal to: MAX(total_remaining_quota/#_of clients, MQS).

In block 212, the client may obtain the granted/transferred quota share associated with block 210. As part of block 212, the client may begin to self-rule at least until its local quota cache drops below a threshold.

In block 214, the client may self-rule by assigning one or more resources to a specific operation (e.g., I/O handling).

Figure 3:
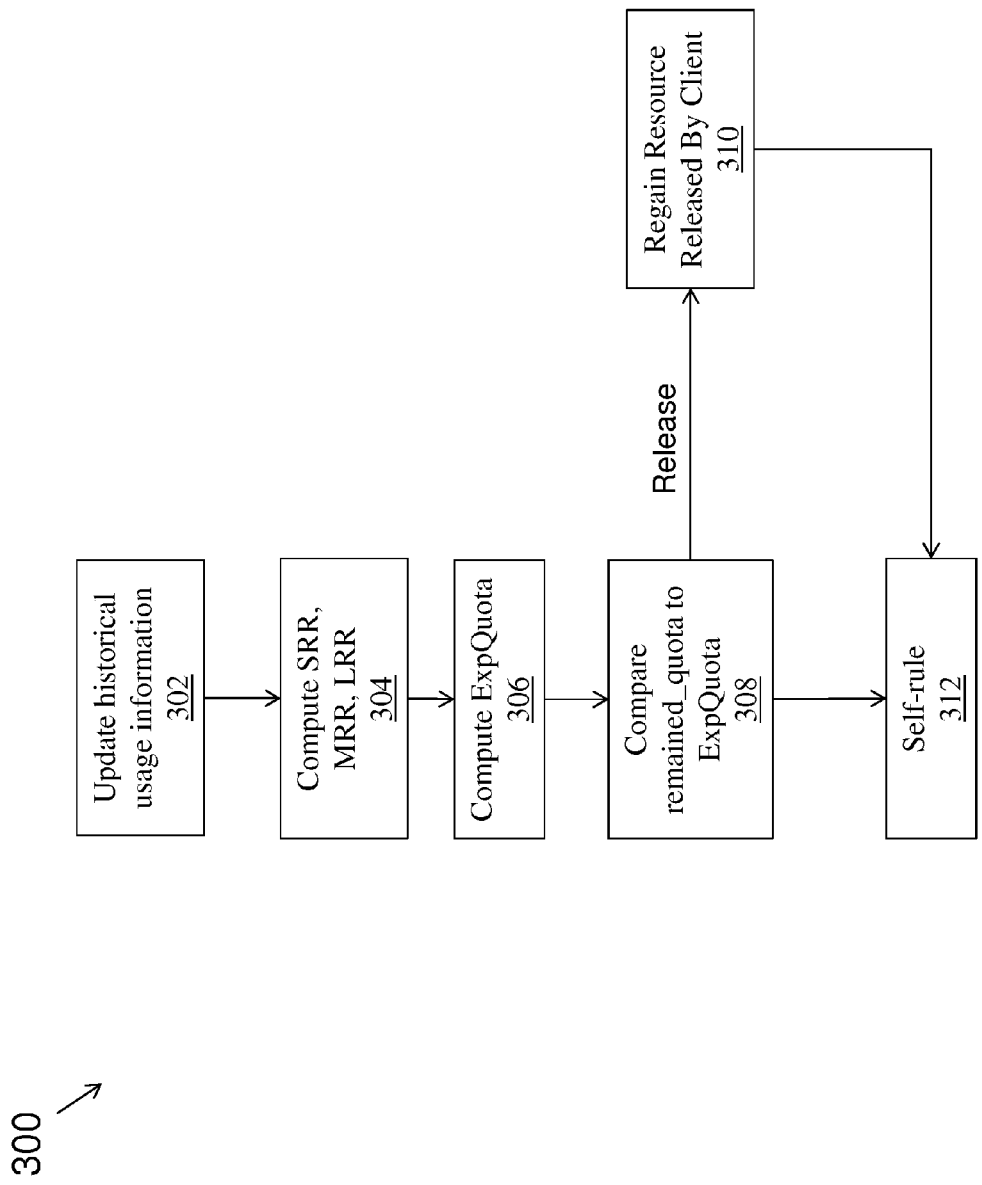
FIG. 3 depicts a process flow based on a recycling of a resource in accordance with an embodiment.

Turning to FIG. 3, a flow chart of a method 300 is shown. The method 300 may be executed by one or more systems, devices, or components, such as those described herein. The method 300 may execute based on, or in response to, a recycling of a resource.

In block 302, a client may update historical usage information.

In block 304, the client may compute a SRR, a MRR, and a LRR. The computation may be based on the vector described above.

In block 306, the client may compute an ExpQuota. For example, the computation of block 306 may take the form: ExpQuota=MAX(MAX(SRR, MRR, LRR)*ESRT, MQS).

In block 308, the client may compare any remaining quota (remained_quota) currently available to the client to the expected quota (ExpQuota). If the remained_quota is greater than or equal to, e.g., four times the ExpQuota (4*ExpQuota), the client may transmit a quota request to the manager so that the client only keeps, e.g., two times the ExpQuota (2*ExpQuota) and releases any excess above 2*ExpQuota to the manager for possible re-allocation, as indicated in block 310. Otherwise, if the remained_quota is less than 4*ExpQuota, the client may simply engage in its own bookkeeping regarding its quota and self-rule, as indicated in block 312. The client may provide an indication of a release to, e.g., the manager as part of the request.

The methods 200 and 300 are illustrative. In some embodiments, one or more of the blocks, or a portion thereof, may be optional. In some embodiments, additional blocks or operations not shown may be included. In some embodiments, the blocks may execute in an order or sequence that is different from what is shown in FIG. 2 and/or FIG. 3.

Technical effects and benefits include an ability to maximize performance and reliability by obtaining an optimal allocation of quota shares. Client requests for quota shares may be tailored to the specific needs of the client, thereby expanding the pool of quota available to other clients. In this manner, client requests for quota are more likely to be satisfied relative to conventional techniques. Furthermore, aspects of the disclosure may be used to reduce signaling between clients and one or more managers, thereby preserving communication bandwidth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically allocating access to a shared resource based on quota shares, the method comprising:
   computing, by a client node, an expected size of quota shares needed by the client node based on a historical rate of resource consumption by the client node, the historical rate of consumption for the client node based on information recorded in a vector, the vector including slots corresponding to time periods, each slot storing index or file usage of the client node during a time period, block usage of the client node during the time period, and a time stamp of the time period;
   transmitting, by the client node, a request to a manager node for a number of quota shares based on the expected size;
   receiving, by the client node, from the manager node, an indication that the request for the number of quota shares is one of: granted, denied, and granted-in-part, the indication including a number of quota shares granted to the client node by the manager node; and
   self-ruling, by the client node, the shared resource based on the indication, the self-ruling performed for an expected self-rule time that is based on the number of quota shares granted to the client node, the self-ruling include assigning the shared resource to a specific operation.

2. The method of claim 1, wherein the transmitted request for the number of quota shares is based on a remaining count of quota of shares available to the client node prior to the transmission of the request.

3. The method of claim 1, wherein the expected size of quota shares is based on resource usage over at least one of: a short-term period, a medium-term period, and a long-term period.

4. The method of claim 1, wherein the expected size of quota shares is based on an established minimal quota share.

5. The method of claim 1, wherein the specific operation comprises input/output handling.

6. The method of claim 1, wherein the transmitted request comprises an indication that the client node is releasing the count of quota shares.

7. The method of claim 1, wherein the vector is updated based on a change in resource usage.

8. The method of claim 1, wherein the vector is updated by a background thread on a periodic basis.

* * * * *